US009246846B2

United States Patent
Fan et al.

(10) Patent No.: US 9,246,846 B2
(45) Date of Patent: Jan. 26, 2016

(54) NETWORK PROCESSOR

(75) Inventors: Kuo-Yen Fan, Hsinchu (TW); Kuo-Cheng Lu, Hsinchu (TW)

(73) Assignee: MEDIATEK CO., Science-Based Industrial Park, Hsin-Chu (TW)

( * ) Notice: Subject to any disclaimer, the term of this patent is extended or adjusted under 35 U.S.C. 154(b) by 114 days.

(21) Appl. No.: 13/528,844

(22) Filed: Jun. 21, 2012

(65) Prior Publication Data

US 2013/0058319 A1    Mar. 7, 2013

Related U.S. Application Data

(60) Provisional application No. 61/530,408, filed on Sep. 2, 2011.

(51) Int. Cl.
| | |
|---|---|
| *H04W 4/00* | (2009.01) |
| *G06F 15/16* | (2006.01) |
| *H04L 12/933* | (2013.01) |
| *H04W 88/16* | (2009.01) |
| *H04W 92/02* | (2009.01) |

(52) U.S. Cl.
CPC .............. *H04L 49/15* (2013.01); *H04W 88/16* (2013.01); *H04W 92/02* (2013.01)

(58) Field of Classification Search
CPC ....................................... H04L 69/30
USPC ......................... 370/338; 709/246
See application file for complete search history.

(56) References Cited

U.S. PATENT DOCUMENTS

| | | | | |
|---|---|---|---|---|
| 5,974,465 | A  * | 10/1999 | Wong ............................ | 709/234 |
| 6,798,751 | B1 * | 9/2004 | Voit et al. ..................... | 370/252 |
| 7,907,630 | B1 | 3/2011 | Bicknell | |
| 8,339,959 | B1 * | 12/2012 | Moisand et al. .............. | 370/235 |
| 2003/0074473 | A1 * | 4/2003 | Pham et al. .................... | 709/246 |
| 2003/0236745 | A1 * | 12/2003 | Hartsell et al. ................... | 705/40 |
| 2006/0168281 | A1 * | 7/2006 | Starr et al. ..................... | 709/230 |
| 2008/0025289 | A1 * | 1/2008 | Kapur et al. ................... | 370/351 |
| 2009/0092136 | A1 * | 4/2009 | Nazareth et al. .............. | 370/392 |
| 2011/0022935 | A1 * | 1/2011 | McDaniel ..................... | 714/807 |
| 2012/0263462 | A1 * | 10/2012 | Koren et al. ..................... | 398/45 |

FOREIGN PATENT DOCUMENTS

| | | |
|---|---|---|
| CN | 101369968 A | 2/2009 |
| EP | 0971289 * | 1/2000 |

OTHER PUBLICATIONS

Ralink, RT3050/52 Datasheet, Aug. 14, 2008 p. 1-2, 27-28, 92, figure 3-17-1.
Pur, Ralink Technology Announces Sample of RT3883 SoC and RT3593 Chips, The Industry's First Single Chip 450Mbps 802.11n Access Point and Station Solutions with Beam Forming Technology, Jan. 7, 2010, paragraph 1.

(Continued)

*Primary Examiner* — Edan Orgad
*Assistant Examiner* — Rebecca Song
(74) *Attorney, Agent, or Firm* — Winston Hsu; Scott Margo

(57) ABSTRACT

The present invention discloses a network processor for a broadband gateway. The network processor includes a host processor; a plurality of networking interfaces, corresponding to a plurality of networking technologies, respectively; and a network address translation (NAT) engine, for accelerating packet processing from a first networking interface to a second networking interface.

19 Claims, 10 Drawing Sheets

(56) References Cited

OTHER PUBLICATIONS

"International Search Report" mailed on Dec. 6, 2012 for International application No. PCT/CN2012/080915, International filing date:Sep. 3, 2012.

Ralink RT3050/52 Datasheet, pp. 1, 2, 27, 28, 31-34, 91-94, Aug. 14, 2008.
RT3050/52 Datasheet, Ralink, Aug. 14, 2008, P1~235.

* cited by examiner

NETWORK PROCESSOR

CROSS REFERENCE TO RELATED APPLICATIONS

This application claims the benefit of U.S. Provisional Application No. 61/530,408, filed on Sep. 2, 2011 and entitled "Network processor with packet accelerator", the contents of which are incorporated herein by reference.

BACKGROUND

The present invention relates to a network processor in broadband internet devices, and more particularly to a network processor with a network address translation (NAT) engine, i.e. a packet accelerator, for accelerating packet processing between different kinds of networking technologies, to reduced power consumption and reserve computing power for other networking applications.

With the rapid development of internet, there are more and more networking applications. Thus, the broadband gateways need to handle many kinds of packet processing via different types of networking technologies, e.g. Ethernet, xDSL (digital subscriber line), ATM (Asynchronous Transfer Mode), WLAN (wireless local area network), 3G/3.5G etc.) as well as the application protocols, e.g. VoIP (Voice over Internet Protocol), DLNA (Digital Living Network Alliance), OSGi (Open Service Gateway Initiative) etc.

Under such a situation, the network processor in the broadband gateway shall boost the performance for these demands. Increasing the Central Processing Unit (CPU) operation frequency is an intuitive approach to boost the network processor performance. However, the power consumption will increase a lot.

Besides, even with higher grade of CPU, the improvement ratio is not enough because of more and more computing power demand due to the above packet processing and applications. Moreover, a conventional packet offload engine only considers a single networking interface instead of different kinds of networking interfaces. Thus, there is a need to improve over the prior art.

SUMMARY

It is therefore an objective of the present invention to provide a network processor with a NAT engine for accelerating packet processing between different kinds of networking technologies, to reduced power consumption and reserve computing power for other networking applications.

The present invention discloses a network processor for a broadband gateway. The network processor includes a host processor; a plurality of networking interfaces, corresponding to a plurality of networking technologies, respectively; and a network address translation (NAT) engine, for accelerating packet processing from a first networking interface to a second networking interface.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
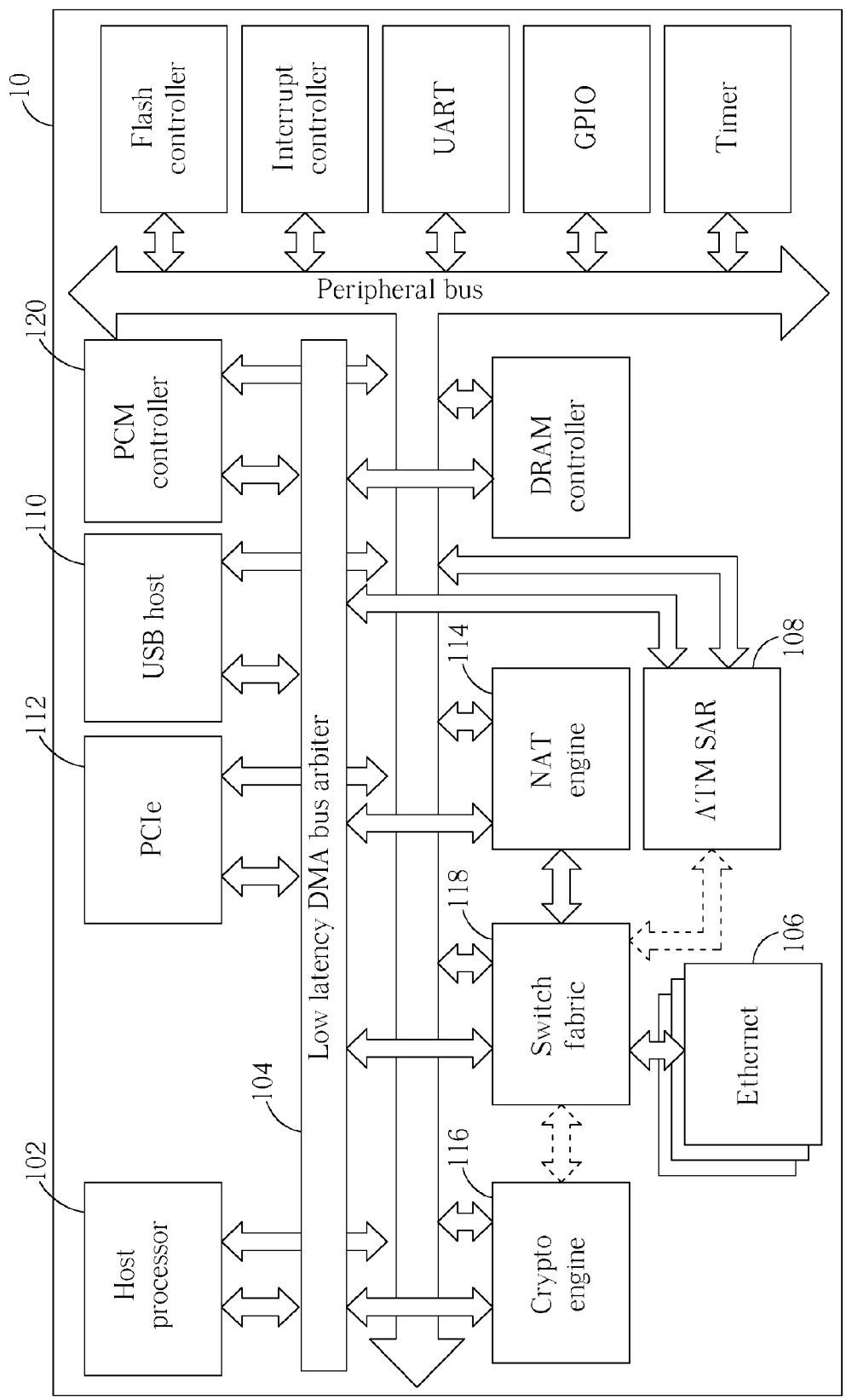
FIG. 1 is a schematic diagram of a network processor according to an embodiment of the present invention.

Please refer to FIG. 1, which is a schematic diagram of a network processor 10 according to an embodiment of the present invention. The network processor 10 includes a host processor 102, a low latency Direct Memory Access (DMA) bus and arbiter 104, networking interfaces 106-112, a network address translation (NAT) engine 114, a crypto engine 116, a switch fabric 118, a Pulse-code modulation (PCM) controller 120 for soft-VoIP application and system peripherals known by those skilled in the art such as a Dynamic Random Access Memory (DRAM) controller, a flash controller, an interrupt controller, Universal Asynchronous Receiver/Transmitter (UART), General Purpose Input/Output (GPIO) and a timer.

The networking interfaces 106-112 are corresponding to different kinds of networking technologies, e.g. an Ethernet interface 106, i.e. 802.3x MAC, for typical local area network (LAN) network, an Asynchronous Transfer Mode (ATM) Segmentation and Reassembly (SAR) interface 108 for broadband internet, a Universal Serial Bus (USB) host interface 110 for 3G/3.5G network and a Peripheral Component Interconnect Express (PCIe) interface 112 for wireless local area network (WLAN) network. The NAT engine 114 accelerates packet processing from a networking interface to another networking interface among the networking interfaces 106-112. Under such a situation, rather than performing all packet processing by an operating system of the host processor 102 in a software manner, the NAT engine 114 can offload packet processing of the host processor 102 in a hardware manner and thus the host processor 102 does not need to perform a lot packet processing. As a result, the present invention can reduce power consumption of the host processor 102 and reserve computing power of the host processor 102 for other networking applications such as soft-VoIP, DLNA and OSGi, so as to achieve a low cost and low power solution while keeping the performance for modern networking application.

Figure 2:
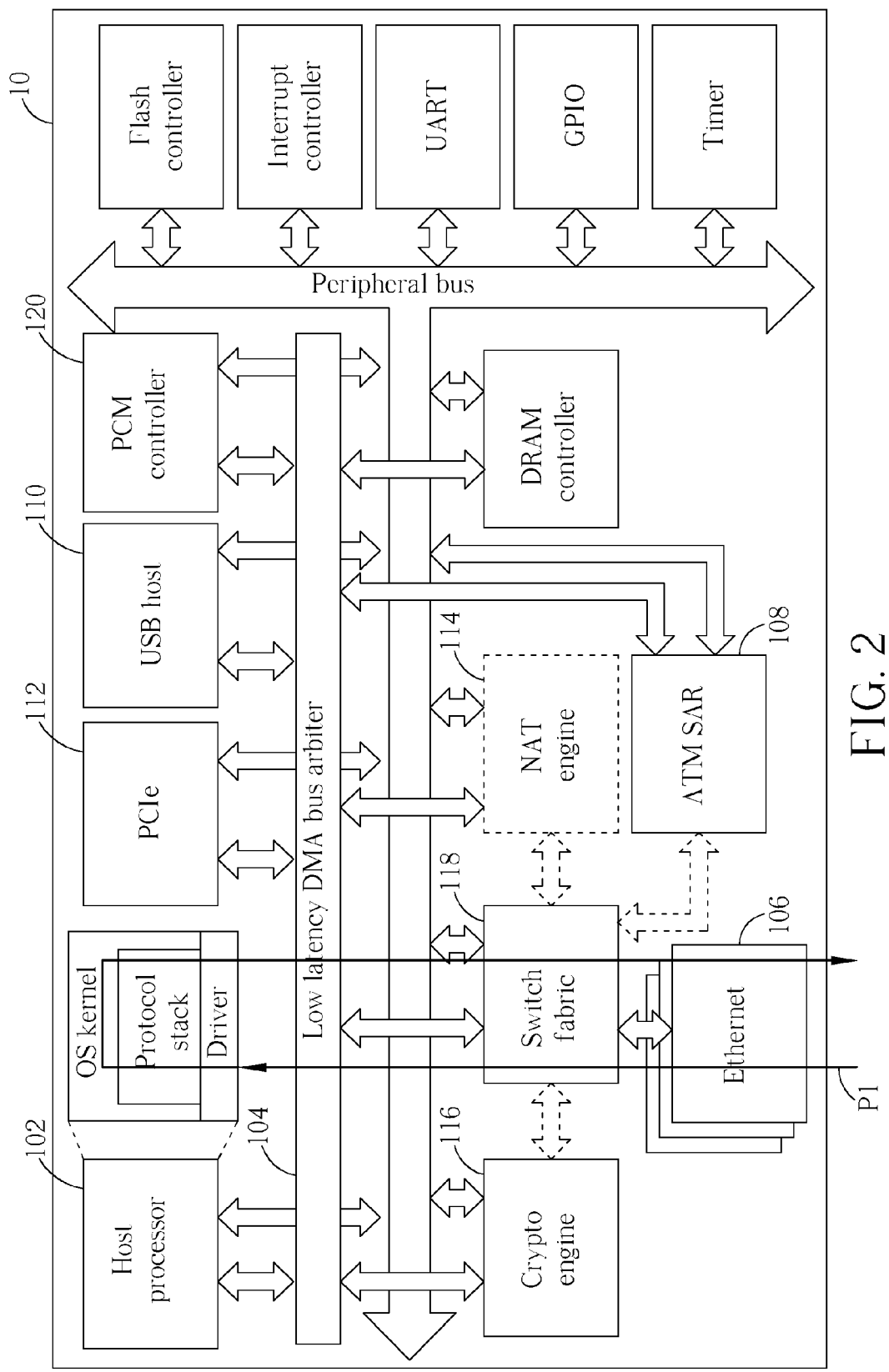
FIG. 2 is a schematic diagram of a data path when a NAT engine shown in FIG. 1 is disabled according to an embodiment of the present invention.

In detail, please refer to FIG. 2, which is a schematic diagram of a data path P1 when the NAT engine 114 shown in FIG. 1 is disabled according to an embodiment of the present invention. As shown in FIG. 2, when the NAT engine 114 is disabled, operations of the network processor 10 are similar to those of the conventional network processor where the CPU performs all packet processing. Therefore, as shown in the data path P1, if packets are from one LAN domain via the Ethernet interface 106 to another LAN domain via the Ethernet interface 106, after the Ethernet interface 106 receives the packets, the switch fabric 118 transfers the packets to the host processor 102 via the DMA bus and arbiter 104, i.e. a system bus. Then, the operating system of the host processor 102 performs all packet processing such as buffer management, classification, modification, egress port lookup, forwarding, QoS, statistic and related OS overhead, etc. for the packets in a software manner. As a result, the host processor 102 requires a lot of computing power and power consumption for packet processing due to rapid growing of modern networking applications as well as the network bandwidth.

Figure 3:
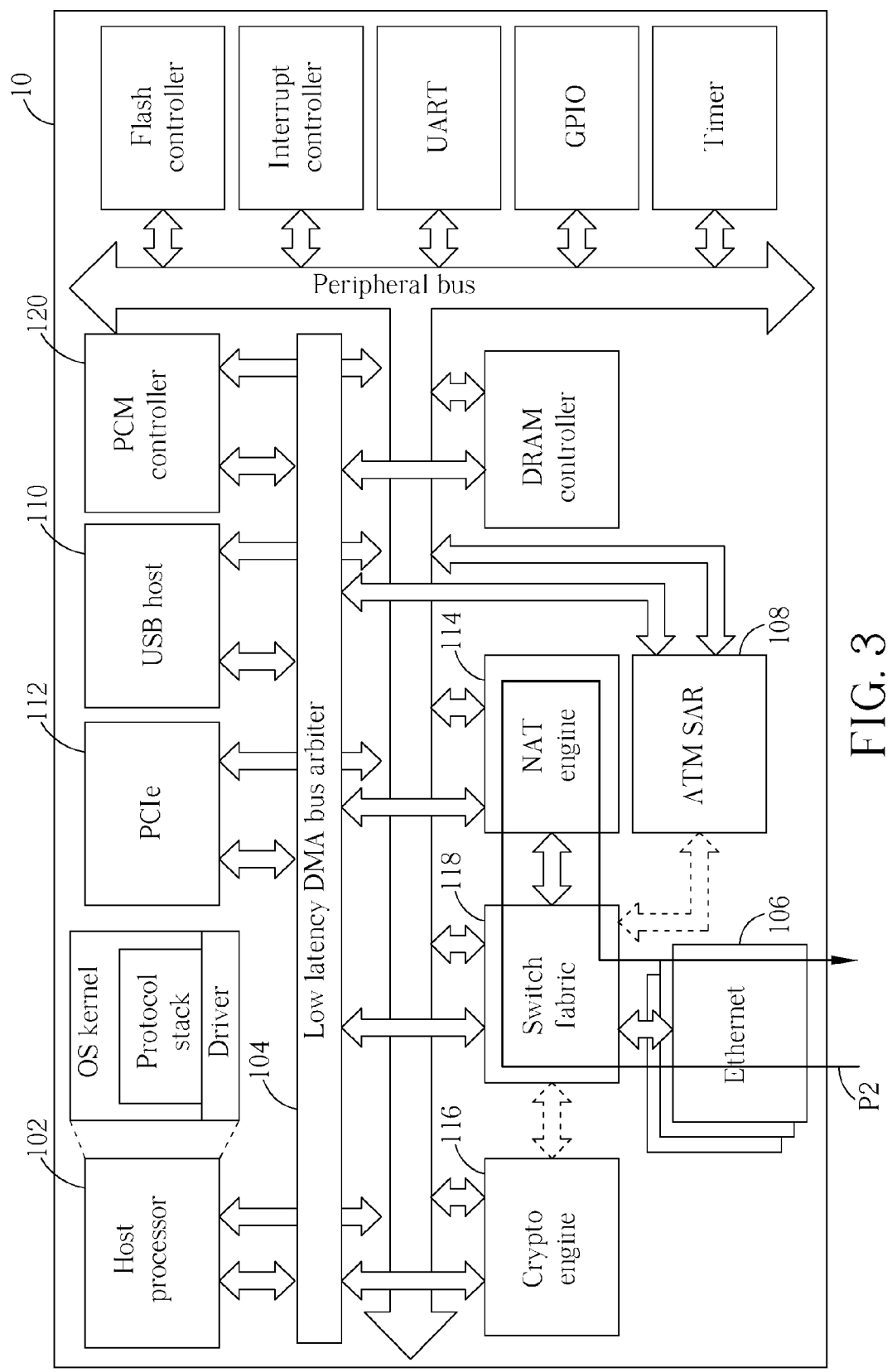
FIG. 3 is a schematic diagram of a data path when the NAT engine shown in FIG. 1 accelerates packet processing from one LAN domain via an Ethernet interface to another LAN domain via the Ethernet interface according to an embodiment of the present invention.

In a first example, please refer to FIG. 3, which is a schematic diagram of a data path P2 when the NAT engine 114 shown in FIG. 1 accelerates packet processing from one LAN domain via the Ethernet interface 106 to another LAN domain via the Ethernet interface 106 according to an embodiment of the present invention. As shown in the data path P2, if packets are from one LAN domain via the Ethernet interface 106 to another LAN domain via the Ethernet interface 106, after the Ethernet interface 106 receives the packets, the switch fabric 118 transfers the packets to the NAT engine 114 instead of the host processor 102. Then, the NAT engine 114 performs all packet processing such as buffer management, classification, modification, egress port lookup, forwarding, QoS, statistic and related OS overhead, etc. for the packets in a hardware manner. As a result, the NAT engine 114 offloads all packet processing of the host processor 102, so as to reduce power consumption and reserve computing power.

Figure 4:
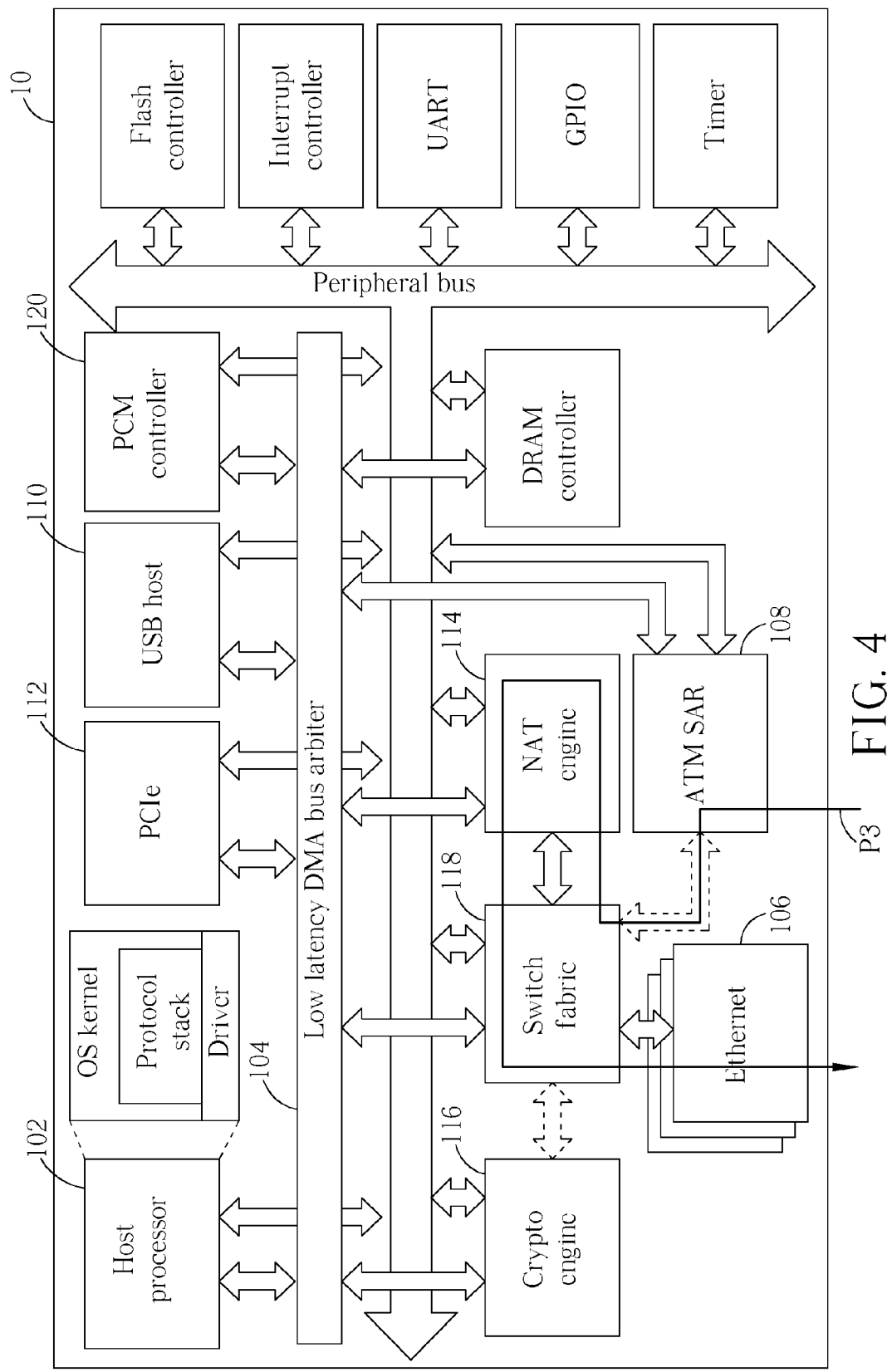
FIG. 4 is a schematic diagram of a data path when the NAT engine shown in FIG. 1 accelerates packet processing from a broadband internet via an ATM SAR interface to a LAN domain via the Ethernet interface according to an embodiment of the present invention.

In a second example, please refer to FIG. 4, which is a schematic diagram of a data path P3 when the NAT engine 114 shown in FIG. 1 accelerates packet processing from a broadband internet via the ATM SAR interface 108 to a LAN domain via the Ethernet interface 106 according to an embodiment of the present invention. As shown in the data path P3, if packets are from a broadband internet via the ATM SAR interface 108 to a LAN domain via the Ethernet interface 106, after the ATM SAR interface 108 receives the packets, the switch fabric 118 transfers the packets to the NAT engine 114 instead of the host processor 102. Then, the NAT engine 114 performs all packet processing such as buffer management, classification, modification, egress port lookup, forwarding, QoS, statistic and related OS overhead, etc. for the packets in a hardware manner. As a result, the NAT engine 114 offloads all packet processing of the host processor 102, so as to reduce power consumption and reserve computing power.

Figure 5:
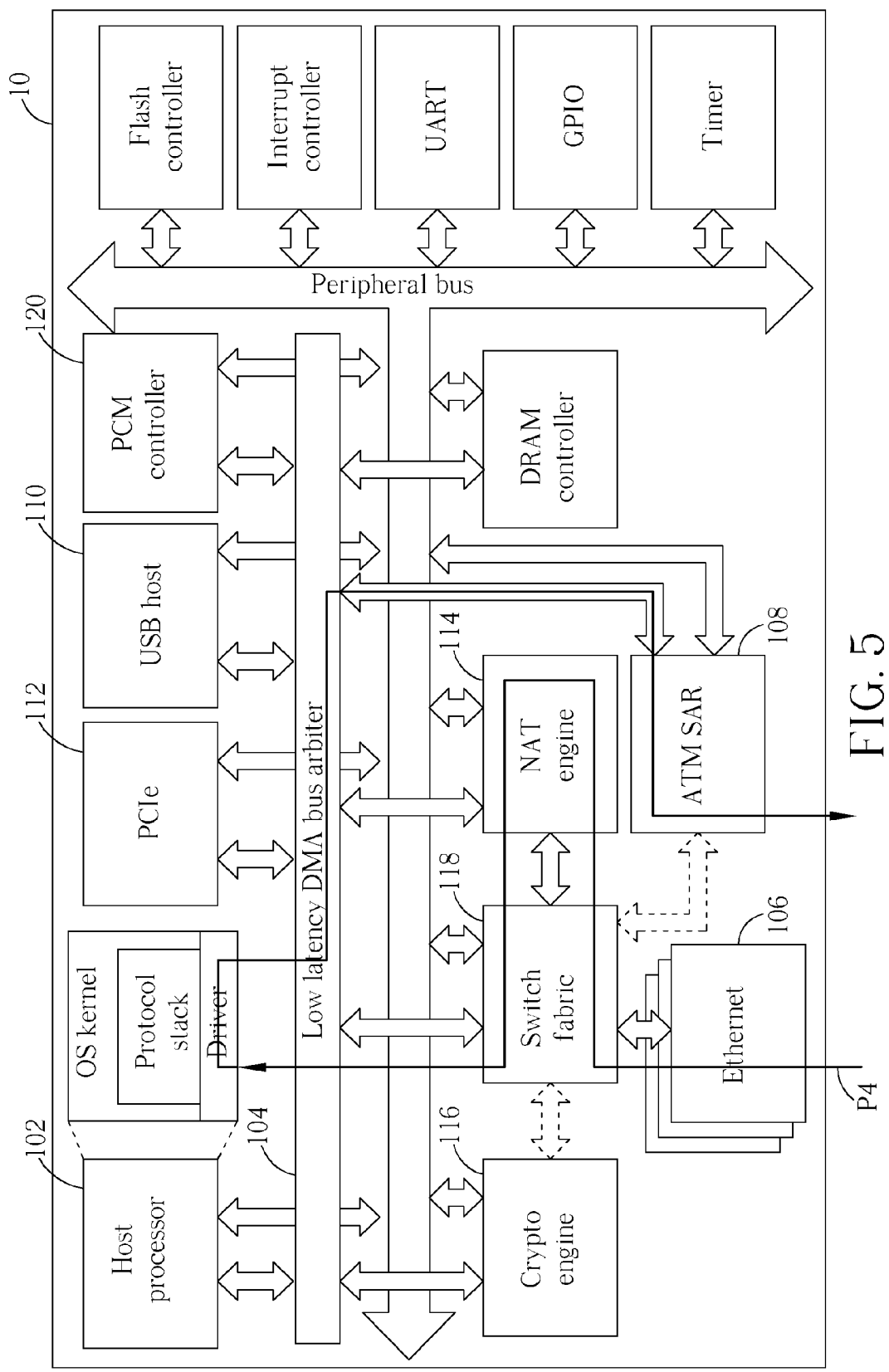
FIG. 5 is a schematic diagram of a data path when the NAT engine shown in FIG. 1 accelerates packet processing from a LAN domain via the Ethernet interface to a broadband internet via the ATM SAR interface according to an embodiment of the present invention.

In a third example, please refer to FIG. 5, which is a schematic diagram of a data path P4 when the NAT engine 114 shown in FIG. 1 accelerates packet processing from a LAN domain via the Ethernet interface 106 to a broadband internet via the ATM SAR interface 108 according to an embodiment of the present invention. As shown in the data path P4, if packets are from a LAN domain via the Ethernet interface 106 to a broadband internet via the ATM SAR interface 108, after the Ethernet interface 106 receives the packets, the switch fabric 118 transfers the packets to the NAT engine 114 first. Then, the NAT engine 114 performs most packet processing such as classification, modification, egress port lookup, QoS statistic in a hardware manner, and the host processor 102 performs remaining packet processing such as forwarding and buffer management with a driver in a software manner. In other words, since internet upstream access is far less than downstream, and the subscribed data rate corresponding to the ATM SAR interface 108 is much lower than that of LAN network, the on-chip memory in the switch fabric 118 is not enough to buffer the peak ingress packets from LAN, and thus the switch fabric 118 routes the packets to the DMA bus and arbiter 104 to store in a system DRAM to avoid packet loss and notifies the driver of the host processor 102 to forward the packets to the ATM SAR interface 108. As a result, the NAT engine 114 offloads partial packet processing of the host processor 102, so as to reduce power consumption and reserve computing power since the driver of the host processor 102 requires little power consumption (TCP has a flow control mechanism to slow ingress packets when egress packet rate does not match, and thus the host processor 102 does not process too much packets).

Figure 6:
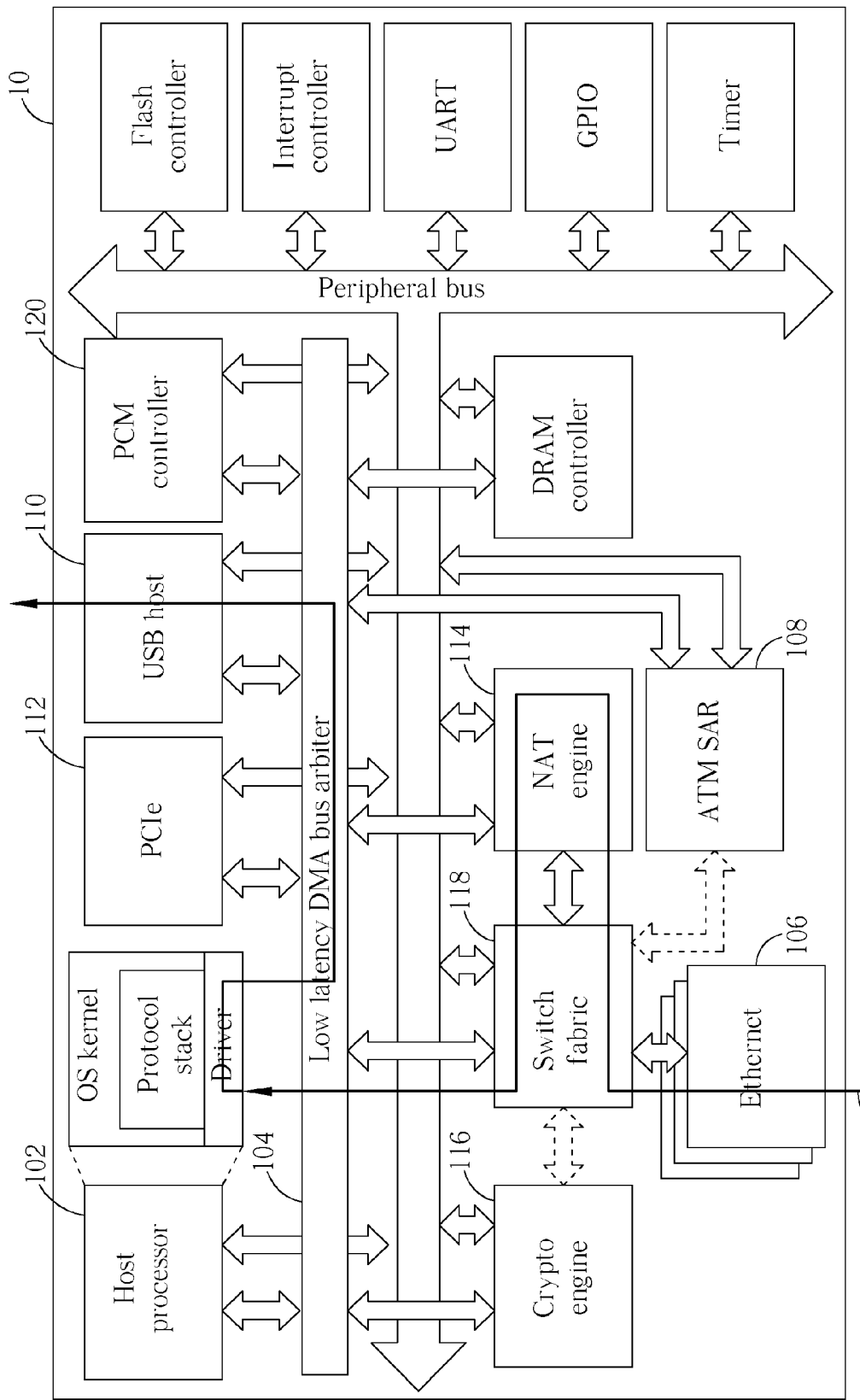
FIGS. 6-7 are schematic diagrams of data paths when the NAT engine shown in FIG. 1 accelerates packet processing from a LAN domain via the Ethernet interface to a 3G/3.5G network via a USB host interface, and from a 3G/3.5G network via the USB host interface to a LAN domain via the Ethernet interface according to an embodiment of the present invention, respectively.
Figure 7:
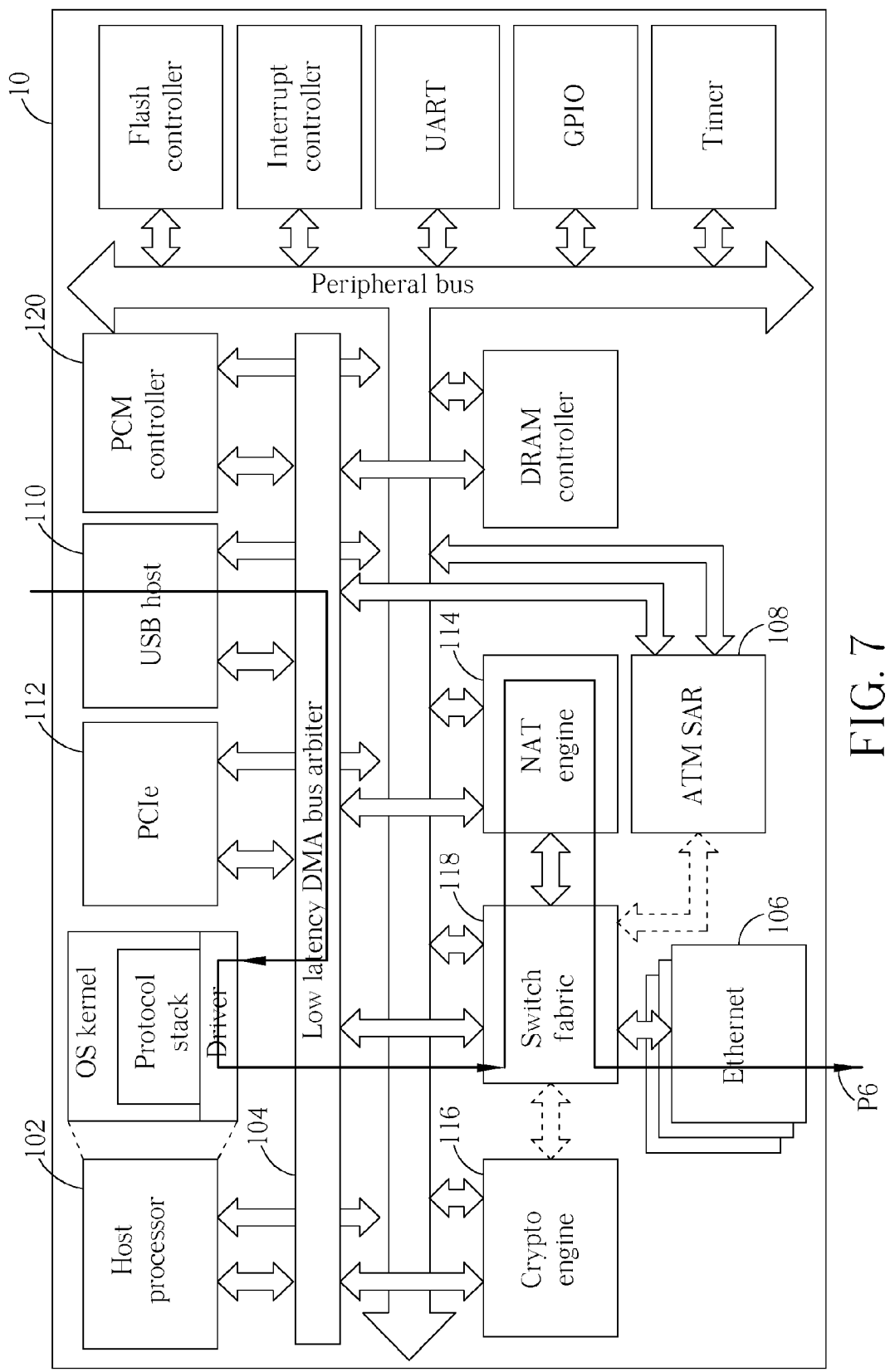

In a fourth and a fifth examples, please refer to FIGS. 6-7, which are schematic diagrams of data paths P5-P6 when the NAT engine 114 shown in FIG. 1 accelerates packet processing from a LAN domain via the Ethernet interface 106 to a 3G/3.5G network via the USB host interface 110, and from a 3G/3.5G network via the USB host interface 110 to a LAN domain via the Ethernet interface 106 according to an embodiment of the present invention, respectively. As shown in the data path P5, if packets are from a LAN domain via the Ethernet interface 106 to a 3G/3.5G network via the USB host interface 110, after the Ethernet interface 106 receives the packets, the switch fabric 118 transfers the packets to the NAT engine 114 first. Then, the NAT engine 114 performs most packet processing such as classification, modification, egress port lookup, QoS statistic in a hardware manner, and the host processor 102 performs remaining packet processing such as forwarding and buffer management with a driver in a software manner. In other words, since the 3G/3.5G network is linked to the network processor 10 by a USB host via the USB host interface 110, the host processor 102 needs to transform the packets from internet access data to USB packets before forwarding the packets to the USB host interface 110, e.g. transforming header of the packets to conform RNDIS for the USB host interface 110 to recognize while data of the packets is still virtually Ethernet-like. Similarly, as shown in the data path P6, if packets are from a 3G/3.5G network via the USB host interface 110 to a LAN domain via the Ethernet interface 106, the host processor 102 needs to transform the packets from USB packets to internet access data before forwarding the packets to the NAT engine 114 for packet processing. As a result, the NAT engine 114 offloads partial packet processing of the host processor 102, so as to reduce power consumption and reserve computing power since the driver of the host processor 102 requires little power consumption.

Figure 8:
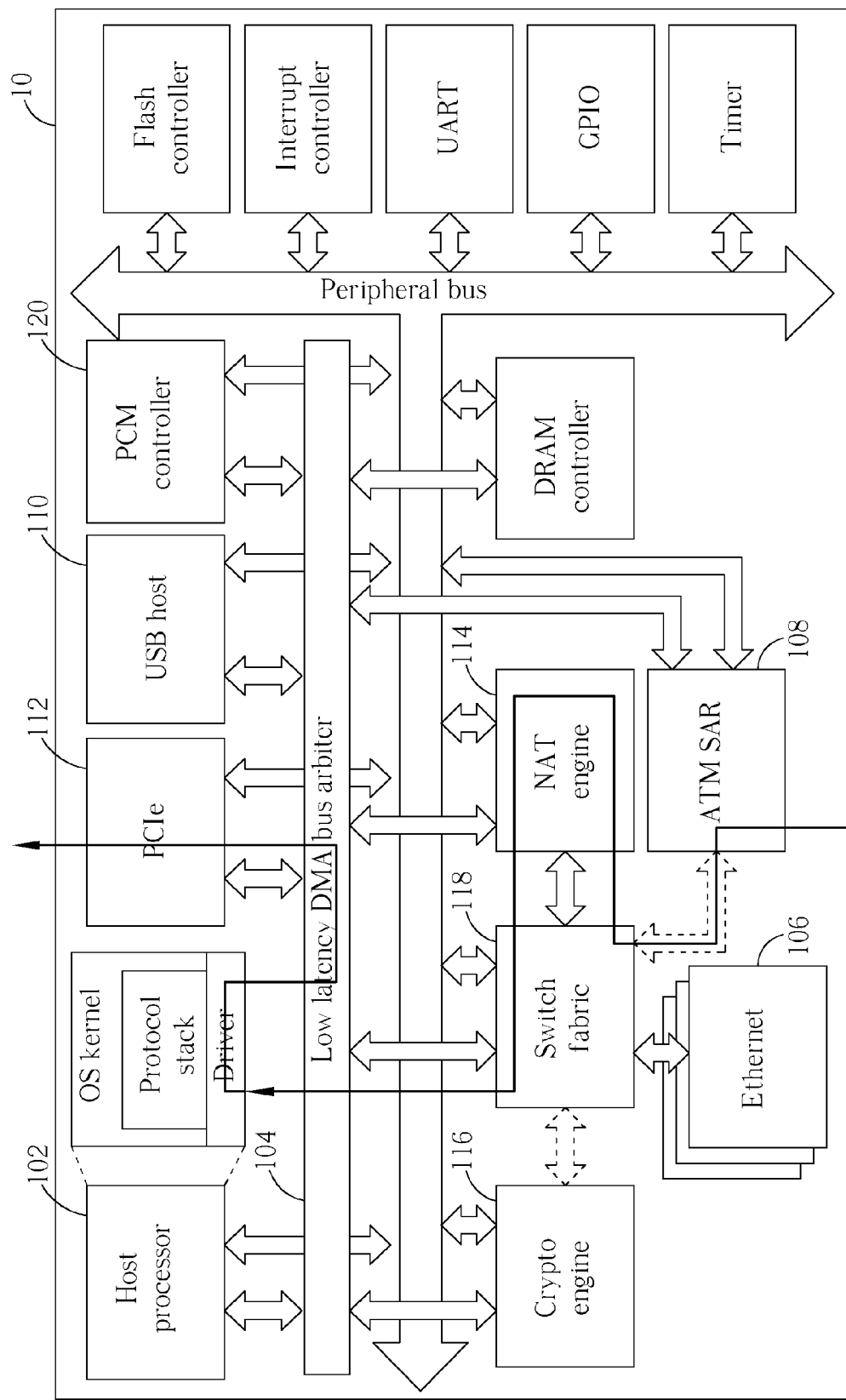
FIG. 8 is a schematic diagram of a data path when the NAT engine shown in FIG. 1 accelerates packet processing from a broadband internet via the ATM SAR interface to a WLAN network via the PCIe interface according to an embodiment of the present invention.

In a sixth example, please refer to FIG. 8, which is a schematic diagram of a data path P7 when the NAT engine 114 shown in FIG. 1 accelerates packet processing from a broadband internet via the ATM SAR interface 108 to a WLAN network via the PCIe interface 112 according to an embodiment of the present invention. As shown in the data path P7, if packets are from a broadband internet via the ATM SAR interface 108 to a WLAN network via the PCIe interface 112, similar to the data path P5 shown in FIG. 6, the NAT engine 114 performs most packet processing such as classification, modification, egress port lookup, QoS statistic in a hardware manner, and the host processor 102 performs remaining packet processing such as forwarding and buffer management with a driver in a software manner. In other words, since the WLAN network is linked to the network processor 10 by a WLAN card via the PCIe interface 112, the host processor 102 needs to transform the packets from internet access data to PCIe packets before forwarding the packets to the PCIe interface 112. As a result, the NAT engine 114 offloads partial packet processing of the host processor 102, so as to reduce power consumption and reserve computing power since the driver of the host processor 102 requires little power consumption.

Figure 9:
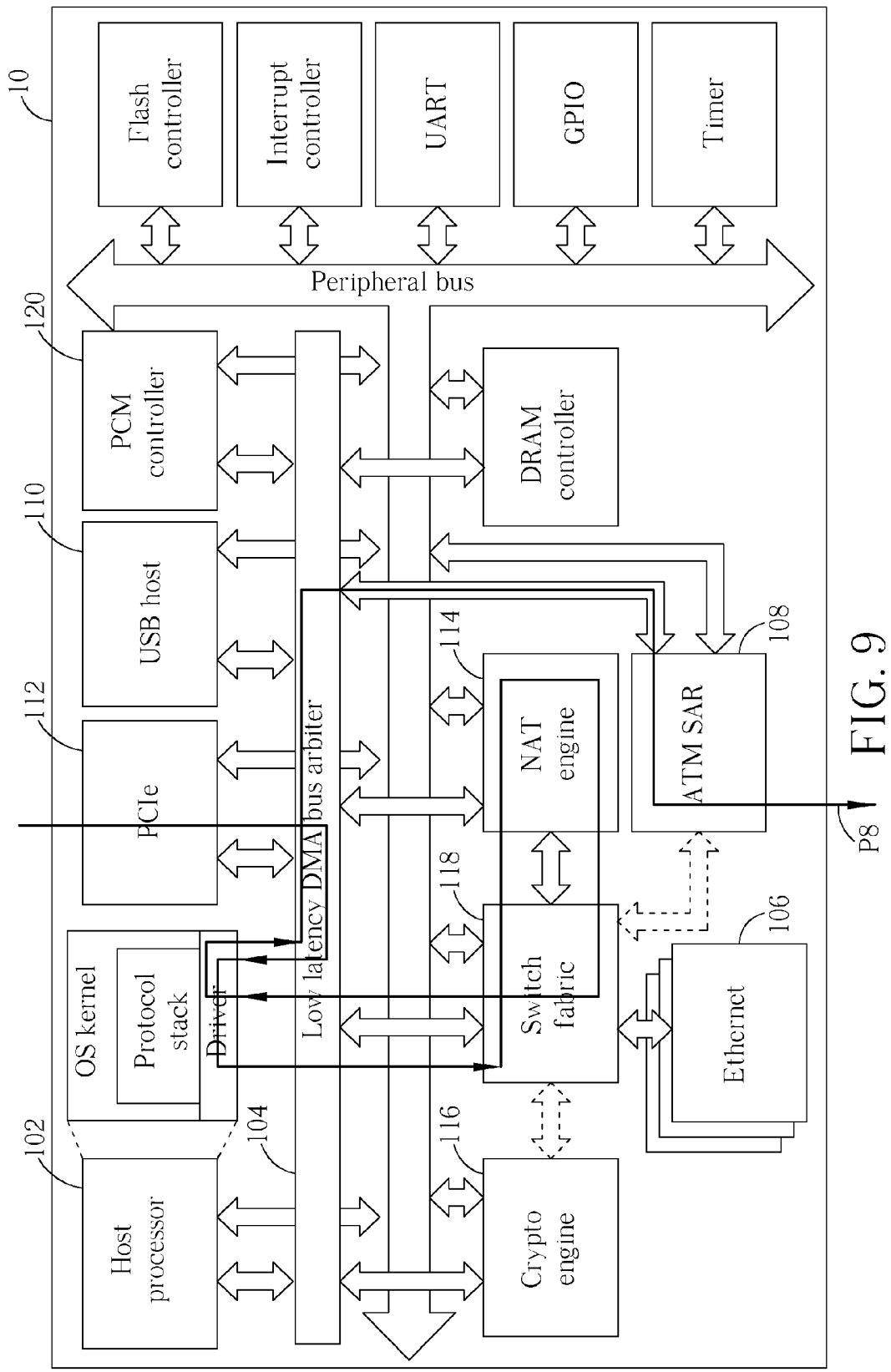
FIG. 9 is a schematic diagram of a data path when the NAT engine shown in FIG. 1 accelerates packet processing from a WLAN network via the PCIe interface to a broadband internet via the ATM SAR interface according to an embodiment of the present invention.

In a seventh example, please refer to FIG. 9, which is a schematic diagram of a data path P8 when the NAT engine 114 shown in FIG. 1 accelerates packet processing from a WLAN network via the PCIe interface 112 to a broadband internet via the ATM SAR interface 108 according to an embodiment of the present invention. As shown in the data path P8, if packets are from a broadband internet via the ATM SAR interface 108 to a WLAN network via the PCIe interface 112, similar to the data path P4 shown in FIG. 5 in combination with the data path P6 shown in FIG. 7, the NAT engine 114 performs most packet processing such as classification, modification, egress port lookup, QoS statistic in a hardware manner, and the host processor 102 performs remaining packet processing such as forwarding and buffer management with a driver in a software manner. In other words, the host processor 102 needs to transform the packets from PCIe packets to internet access data before forwarding the packets to the NAT engine 114 for packet processing. After the NAT engine 114 performs most of the packet processing, since internet upstream access is far less than downstream, and the subscribed data rate corresponding to the ATM SAR interface 108 is much lower than that of WLAN network, the on-chip memory in the switch fabric 118 is not enough to buffer the peak ingress packets from WLAN, and thus the switch fabric 118 routes the packets to the DMA bus and arbiter 104 to store in a system DRAM and notifies the driver of the host processor 102 to forward the packets to the ATM SAR interface 108. As a result, the NAT engine 114 offloads partial packet processing of the host processor 102, so as to reduce power consumption and reserve computing power since the driver of the host processor 102 requires little power consumption.

Figure 10:
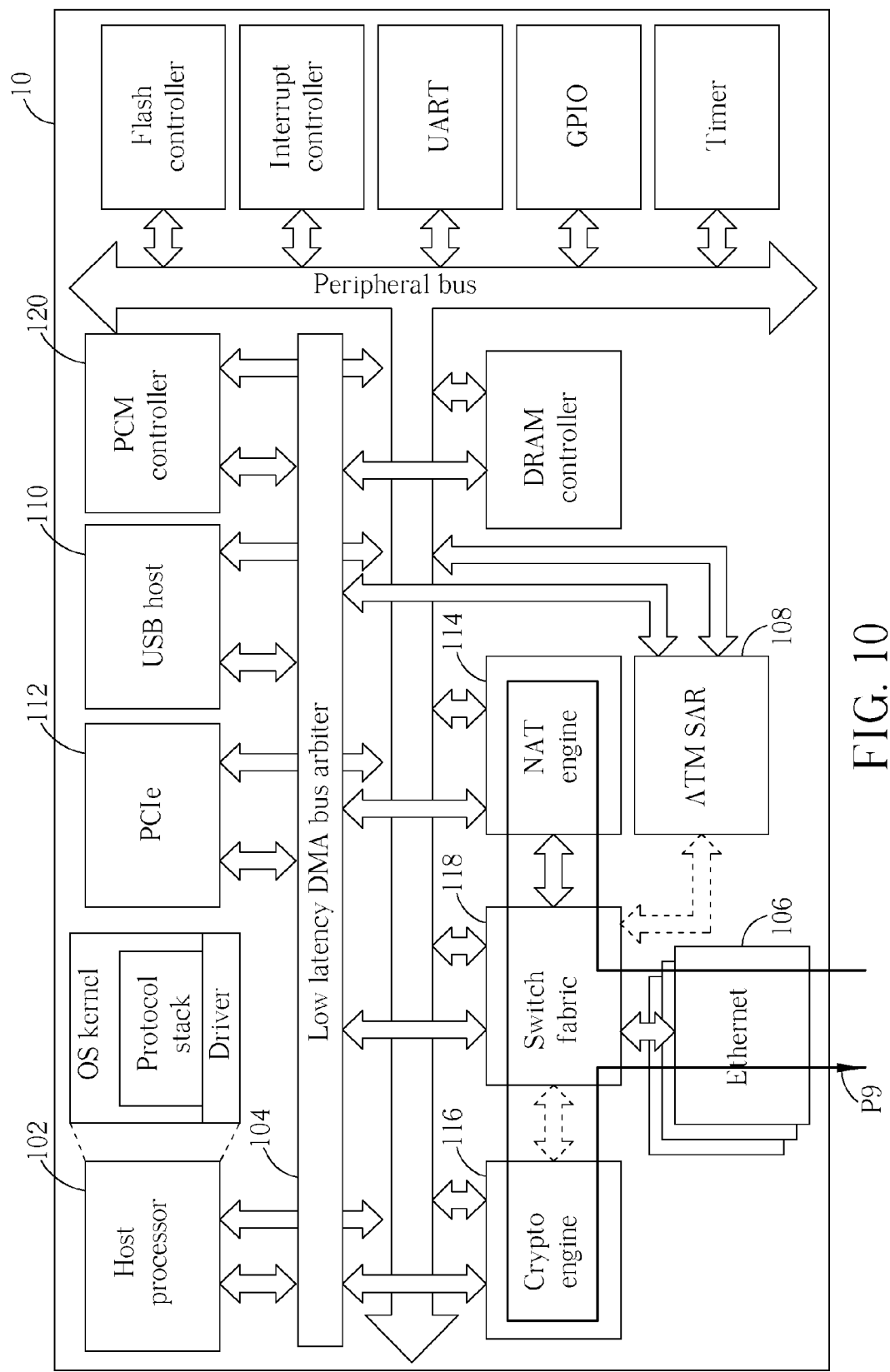
FIG. 10 is a schematic diagram of a data path when the NAT engine shown in FIG. 1 accelerates packet processing from one LAN domain via the Ethernet interface to another LAN domain via the Ethernet interface and a crypto engine performs encryption processing according to an embodiment of the present invention.

In an eighth example, please refer to FIG. 10, which is a schematic diagram of a data path P9 when the NAT engine 114 shown in FIG. 1 accelerates packet processing from one LAN domain via the Ethernet interface 106 to another LAN domain via the Ethernet interface 106 and the crypto engine 116 performs encryption processing according to an embodiment of the present invention. As shown in the data path P9, if packets are from one LAN domain via the Ethernet interface 106 to another LAN domain via the Ethernet interface 106, after the Ethernet interface 106 receives the packets, similar to the data path P2 shown in FIG. 3, the NAT engine 114 performs all packet processing such as buffer management, classification, modification, egress port lookup, forwarding, QoS, statistic and related OS overhead, etc. for the packets in a hardware manner. Then, the switch fabric 118 forwards the processed the packets to the crypto engine 116 for perform encryption processing in a hardware manner, which is different from a conventional crypto engine coupled to and controlled by the host processor via a DMA bus. As a result, the crypto engine 116 offloads encryption processing of the host processor 102, so as to reduce power consumption and reserve computing power.

Noticeably, the embodiments of the present invention are to offload packet processing of the host processor 102 in a hardware manner when packets are from a networking interface to another networking interface, so as to reduce power consumption and reserve computing power for other networking applications. Those skilled in the art should make modifications or alterations accordingly. For example, in the above embodiments, the 3G/3.5G network is linked by a USB host via the USB host interface 110 and the WLAN network is lined by a WLAN card via the PCIe interface 112, which are more cost-effective than embedding respective modules in the network processor 10, but the network processor 10 can be linked with the 3G/3.5G network and the WLAN network by other methods as well. Besides, since the switch fabric 118 performs layer-2 packet processing, if packets are transmitted in a same LAN domain (not via a router), the network processor 10 can utilize only the switch fabric 118 to transfer the packets. Moreover, the above embodiments only illustrate several cases of transmitting packets from a networking interface to another networking interface. In other embodiments, modifications or alterations can be made to derive cases not illustrated in the above as long as packet processing/encryption processing of the host processor 102 are offloaded and packet processing can be performed correctly, e.g. packets are stored in the system DRAM before output to avoid packet loss if an output interface is the ATM SAR interface 108.

In the prior art, the network processor increases CPU operation frequency boost performance and thus increases power consumption, or upgrades CPU and thus increases cost. In comparison, the present invention offloads packet processing of the host processor in a hardware manner when packets are from a networking interface to another networking interface, so as to reduce power consumption and reserve computing power for other networking applications.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A network processor for a broadband gateway, comprising:
 a host processor;
 a plurality of networking interfaces corresponding to a plurality of networking technologies, respectively;
 a network address translation (NAT) engine, for accelerating packet processing from a first networking interface to a second networking interface; wherein the NAT engine offloads partial packet processing of the host processor for a packet from the first networking interface to the second networking interface, and the host processor performs forwarding and buffer management for the packet processed by NAT engine; and
 a switch fabric, for routing the packet processed by NAT engine to store the processed packet into a memory when a data rate corresponding to the first networking interface is greater than that of the second networking interface, wherein the memory is not in the processor.

2. The network processor of claim 1, further comprising: the NAT engine accelerates packet processing from a first local area network (LAN) domain via an Ethernet interface to a second LAN domain via the Ethernet interface.

3. The network processor of claim 2, wherein the NAT engine offloads all packet processing of the host processor.

4. The network processor of claim 1, further comprising: the NAT engine accelerates packet processing from a broadband internet via an Asynchronous Transfer Mode (ATM) Segmentation and Reassembly (SAR) interface to a LAN domain via an Ethernet interface.

5. The network processor of claim 4, wherein the NAT engine offloads all packet processing of the host processor.

6. The network processor of claim 1, wherein the NAT engine accelerates packet processing from a LAN domain via an Ethernet interface to a broadband internet via an ATM SAR interface.

7. The network processor of claim 6, wherein the NAT engine offloads processing of classification, modification, egress port lookup and QoS statistic of the host processor.

8. The network processor of claim 7, wherein packets are stored in a Dynamic Random Access Memory (DRAM) before the host processor forwards the packets to the ATM SAR interface.

9. The network processor of claim 1, wherein the NAT engine accelerates packet processing from a LAN domain via an Ethernet interface to a 3G/3.5G network via a Universal Serial Bus (USB) host interface.

10. The network processor of claim 9, wherein the NAT engine offloads processing of classification, modification, egress port lookup and QoS statistic of the host processor.

11. The network processor of claim 10, wherein the host processor transforms packets between USB packets and internet access data.

12. The network processor of claim 1, further comprising: the NAT engine accelerates packet processing from a broadband internet via an ATM SAR interface to a wireless local area network (WLAN) network via a Peripheral Component Interconnect Express (PCIe) interface.

13. The network processor of claim 12, wherein the NAT engine offloads processing of classification, modification, egress port lookup and QoS statistic of the host processor.

14. The network processor of claim 13, wherein the host processor transforms packets from internet access data into PCIe packets.

15. The network processor of claim 1, wherein the NAT engine accelerates packet processing from a WLAN network via a PCIe interface to a broadband internet via an ATM SAR interface.

16. The network processor of claim 15, wherein the NAT engine offloads processing of classification, modification, egress port lookup and QoS statistic of the host processor.

17. The network processor of claim 16, wherein the host processor transforms packets from PCIe packets into internet access data, and packets are stored in a DRAM before the host processor forwards the packets to the ATM SAR interface.

18. The network processor of claim 1 further comprising a crypto engine, for offloading encryption processing of the host processor when the packets are received from the first networking interface and are transmitted to the second networking interface.

19. The network processor of claim 1, wherein the switch fabric, for performing layer-2 packet processing.

* * * * *

UNITED STATES PATENT AND TRADEMARK OFFICE
CERTIFICATE OF CORRECTION

| | | |
|---|---|---|
| PATENT NO. | : 9,246,846 B2 | Page 1 of 1 |
| APPLICATION NO. | : 13/528844 | |
| DATED | : January 26, 2016 | |
| INVENTOR(S) | : Kuo-Yen Fan et al. | |

It is certified that error appears in the above-identified patent and that said Letters Patent is hereby corrected as shown below:

On the title page, item (73), correct the name of the assignee from "MEDIATEK CO." to --MEDIATEK INC.--.

Signed and Sealed this
Thirty-first Day of May, 2016

Michelle K. Lee
*Director of the United States Patent and Trademark Office*